(12) United States Patent
Zika et al.

(10) Patent No.: US 12,126,585 B2
(45) Date of Patent: Oct. 22, 2024

(54) SELECTING MESSAGE ROUTING PROVIDERS FOR MESSAGE ROUTING BY COMMUNICATION SERVICES PLATFORM

(71) Applicant: Twilio Inc., San Francisco, CA (US)

(72) Inventors: Adam Zika, Prague (CZ); Meelis Aus, Tallinn (EE); Riivo Kikas, Tallinn (EE); Nariman Nazari, Malmö (SE); Ilja Samoilov, Tallinn (EE)

(73) Assignee: Twilio Inc., San Francisco, CA (US)

( * ) Notice: Subject to any disclaimer, the term of this patent is extended or adjusted under 35 U.S.C. 154(b) by 36 days.

(21) Appl. No.: 17/988,750

(22) Filed: Nov. 16, 2022

(65) Prior Publication Data

US 2024/0163237 A1      May 16, 2024

(51) Int. Cl.
  *H04L 51/066*    (2022.01)
  *H04L 45/85*     (2022.01)
  *H04L 45/302*    (2022.01)

(52) U.S. Cl.
  CPC ............ *H04L 51/066* (2013.01); *H04L 45/85* (2022.05); *H04L 45/3065* (2013.01)

(58) Field of Classification Search
  CPC ..... H04L 45/85; H04L 45/3065; H04L 67/53; H04L 51/214; H04L 69/14
  See application file for complete search history.

(56) References Cited

U.S. PATENT DOCUMENTS

| | | | |
|---|---|---|---|
| 9,467,970 B1 * | 10/2016 | Kim | H04L 67/30 |
| 11,223,553 B1 * | 1/2022 | Shcherbakov | H04L 45/124 |
| 11,290,352 B2 | 3/2022 | O'Shaughnessy et al. | |
| 2008/0294735 A1 * | 11/2008 | Muntermann | H04L 51/214 |
| | | | 709/206 |
| 2017/0041213 A1 * | 2/2017 | Nadalin | H04W 36/30 |
| 2017/0366497 A1 * | 12/2017 | Feng | H04W 4/12 |
| 2019/0208373 A1 * | 7/2019 | Stuehrmann | H04W 24/00 |
| 2021/0264489 A1 * | 8/2021 | Chen | H04M 15/8221 |

(Continued)

OTHER PUBLICATIONS

International Search Report and Written Opinion for International Application No. PCT/US2023/79908, mailed Mar. 4, 2024, 14 Pages.

*Primary Examiner* — Johnny B Aguiar
(74) *Attorney, Agent, or Firm* — Lowenstein Sandler LLP (57) ABSTRACT

An example method of selecting message routing providers based on message delivery data reported by multiple customers includes: identifying a plurality of message routing providers serving a specified destination network; receiving, from a plurality of message originating entities, message delivery data reflecting message delivery by the plurality of message routing providers to the specified destination network; estimating, based on the message delivery data, for each message routing provider of the plurality of message routing providers, a corresponding message conversion rate reflecting a likelihood of successful message delivery by a respective message routing provider to the specified destination network; receiving one or more messages from a message originating entity that has not provided at least part of the message delivery data; and identifying, based on message conversion rates for respective message routing providers, one or more message routing providers for routing the one or more messages to the destination network.

19 Claims, 7 Drawing Sheets

(56) References Cited

U.S. PATENT DOCUMENTS

2021/0344575 A1* 11/2021 O'Shaughnessy ............................ H04L 41/0823
2023/0232223 A1* 7/2023 Kocic ................... H04W 12/06
726/2

* cited by examiner

|  | Customer 1 | Customer 2 | Customer 3 | Customer 4 |
|---|---|---|---|---|
| Provider A | # delivered A1 | # delivered A2 | # delivered A3 | # delivered A4 |
|  | # routed A1 | # routed A2 | # routed A3 | # routed A4 |
| Provider B | # delivered B1 | # delivered B2 | # delivered B3 | # delivered B4 |
|  | # routed B1 | # routed B2 | # routed B3 | # routed B4 |
| Provider C | # delivered C1 | # delivered C2 | # delivered C3 | # delivered C4 |
|  | # routed C1 | # routed C2 | # routed C3 | # routed C4 |
| Provider D | # delivered D1 | # delivered D2 | # delivered D3 | # delivered D4 |
|  | # routed D1 | # routed D2 | # routed D3 | # routed D4 |

SELECTING MESSAGE ROUTING PROVIDERS FOR MESSAGE ROUTING BY COMMUNICATION SERVICES PLATFORM

TECHNICAL FIELD

Aspects and implementations of the disclosure relate to computer networking, and more specifically, to systems and methods for message routing by a communication services platform.

BACKGROUND

Instant messaging (IM) technology allows real-time transmission of media content over the Internet or another packet switched network. Sender-originated messages may be transmitted to one or more recipients, which may be connected to a destination network via a common application. Short Messaging Service (SMS) technology provides text messaging, i.e., sending an SMS message to one or more mobile client devices over a cellular data network. Multimedia Messaging Service (MMS) technology provides a way to send messages that include multimedia content to one or more mobile client devices over a cellular data network.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

DETAILED DESCRIPTION

Various organizations have increasingly adopted messaging as a valuable tool for communications within and outside of the organization. In an example use case, an organization may use messaging to forward to client devices of its end users one-time passwords for a two-factor authentication scheme. In another example use case, an organization may use messaging to send promotional messages to client devices of its end users. In yet another example use case, an organization may use messaging to send appointment reminders to client devices of its end users and may further request the message receiver to reply to either confirm or cancel an appointment.

In these and various other use cases, organizations may employ communication services platforms, such as Software as a Service (SaaS) platforms, which facilitate sending of messages (such as SMS messages, MMS messages, and/or IM messages) generated by multiple message originating entities ("customers" of the communication services platform) to recipient devices via multiple message routing providers.

Message routing providers that are utilized by a given communication services platform may employ different communication technologies, networks, and/or configurations, which may result in different values of one or more chosen quality and/or performance metrics. In an illustrative example, a performance metric may be derived from a message conversion rate, which reflects an estimated likelihood of successful message delivery to the intended recipients.

Furthermore, each message routing provider may have its own pricing model, which may be, e.g., a fixed price for routing a specified number of messages, volume-dependent price, time-of-day dependent price, and/or various combinations of these and other pricing models. Conversely, each customer of a communication services platform may choose a suitable traffic optimization objective, which may be expressed by a set of requirements, e.g., specifying the desired message conversion rate and price.

In order to meet the customer requirements, the communication services platform may dynamically allocate customer-originating messages to the available message routing providers serving a specified destination network (which may be identifier, e.g., by the Mobile Country Code (MCC) and/or Mobile Network Code (MNC)). In some implementations, the communication services platform may utilize customer-provided message delivery feedback in order to estimate the message conversion rates for the available message routing providers.

However, the naïve technique for computing the message conversion rates as provider-specific ratios of the messages transmitted by a specific routing provider that were successfully delivered to respective client devices may not always produce useful results since the customer-reported message delivery feedback may be distorted. Such distortions may be caused by the fact that the message delivery is not measured by a customer directly, but rather is based on end user's actions following a successful message delivery (e.g., an end user entering the on-time password that had been sent to their client device via an SMS), and such actions may not always be strictly correlated with successful message delivery (e.g., an end user may fail to proceed with an attempted authentication process despite the successful delivery of an one-time password via an SMS to their client device). While such distortions may be described by various statistical models, the parameters of the statistical distributions would likely be dependent on a specific application being utilized by end users, and thus the values of such parameters may not be easily determined by the communication services platform. For example, an end user is more likely to utilize a one-time password delivered via SMS for logging into a personal banking application than click on a link embedded into a promotional message. Furthermore, the customer-reported message delivery feedback may be distorted due to on various other unpredictable and/or unknown factors.

The issue may be exacerbated if different feedback-providing customers have different routing optimization objectives and/or use different routing models. Therefore, the naïvely computed message conversion rates would not always yield reliable routing decisions (i.e., allocation of messages to message routing providers).

Furthermore, some customers may provide delayed message delivery feedback, aggregated message delivery feedback, or no message delivery feedback at all, thus preventing the communication services platform from using even the naïvely computed message conversion rates for making message routing decisions.

Aspects of the present disclosure address the above-mentioned and other challenges by estimating the provider-specific message conversion rates based on message delivery feedback provided by multiple message-originating entities (e.g., customers of the communication services platform). Thus, the message delivery data reported by multiple customers is utilized for making routing decisions for the feedback providing customers and/or for no-feedback customers.

Each of the customers may have its own traffic optimization objective expressed by a corresponding set of requirements. The routing decisions may be made by the communication services platform by feeding the computed message conversion rates to one or more customer-specific routing models. A routing model may treat the message conversion rates as estimated likelihood of message delivery by respective message routing provider. Accordingly, the routing module may distribute the customer-originated messages among the routing providers in order to satisfy the customer-specific traffic optimization objective. Thus, the message delivery feedback reported by multiple feedback-providing customers is pooled together and utilized for estimating provider-specific message conversion rates, which then are used for routing decisions for message delivery feedback-providing customers and/or no-feedback customers.

In an illustrative example, a communication services platform receives, from multiple feedback-providing customers, message delivery data reflecting message delivery outcomes by a pool of message routing providers to the specified destination network. Based on the message delivery data, the communication services platform determines raw message conversion rates for respective message routing providers, such that each raw message conversion rate reflects the ratio of a number of delivered messages to the number of forwarded messages by a respective message routing provider. The raw message conversion rates may then be normalized by the maximum raw message conversion rate among the raw message conversion rate for the pool of message routing providers.

For each normalized raw message conversion rate, a respective confidence interval may then be determined based on the number of forwarded messages by the respective message routing provider, such that higher numbers of forwarded messages would yield narrower confidence intervals. For each message routing provider, a corresponding upper confidence bound (UCBs) may be determined as a linear combination (e.g., the sum) of the corresponding normalized raw message conversion rate and the corresponding confidence interval.

The communication services platform may then compute pairwise normalized message conversion rate differences for each pair of message routing providers. The computed values may then be weighted by a set of weight coefficients, which may be based, e.g., on inverse squared sums of the confidence intervals of the respective provider pair. A system formed by the equations specifying the weighted pairwise normalized message conversion rate differences may then be solved to produce the message conversion rates that can be utilized for making message routing decisions, as described in more detail herein below.

Furthermore, in some implementations, in order to detect and react to abruptly changing provider-specific message conversion rates, the communication services platform may maintain provider-specific sliding windows, such that each sliding window would include a predefined number of messages of a chosen message routing provider. Responsive to detecting a significant difference between the message conversion rates in the current and previous sliding windows of a certain message routing provider, the communication services platform may reset the message delivery counters associated with this provider before proceeding to compute the message conversion rates, as described in more detail herein below.

Accordingly, the present disclosure addresses the technical problem of accurately estimating the likelihood of successful message delivery by a message routing provider based on message delivery feedback reflecting the provider's past performance in delivering messages for multiple customers.

A technical solution to the above-identified technical problem involves generating a system of equations specifying weighted pairwise normalized message conversion rate differences, which may then is solved numerically to produce the message conversion rates that can be utilized for making message routing decisions.

Another technical solution to the above-identified technical problem involves detecting and reacting to abruptly changing provider-specific message conversion rates by monitoring provider-specific sliding windows and resetting the message delivery counters associated with a message routing provider exhibiting a significant difference between the message conversion rates in the current and previous sliding windows.

Thus, the technical effect includes utilizing message delivery data reported by multiple customers for making routing decisions for the feedback providing customers and/or for no-feedback customers, thus increasing the accuracy of predicted message conversion rates due to the larger available data set. Furthermore, abrupt changes in provider-specific message conversion rates may be detected faster due to the larger available data set. Finally, the provider exploration costs and associated performance sacrifices may be shared between multiple customers. "Provider exploration" herein refers to a technique involving routing a certain number of messages to multiple suboptimal providers, in order to collect message delivery data that is sufficient for estimating the message conversion rates for each of those providers, as described in more detail herein below.

Various aspects of the methods and systems are described herein by way of examples, rather than by way of limitation. The systems and methods described herein may be implemented by hardware (e.g., general purpose and/or specialized processing devices, and/or other devices and associated circuitry), software (e.g., instructions executable by a processing device), or a combination thereof.

Figure 1:
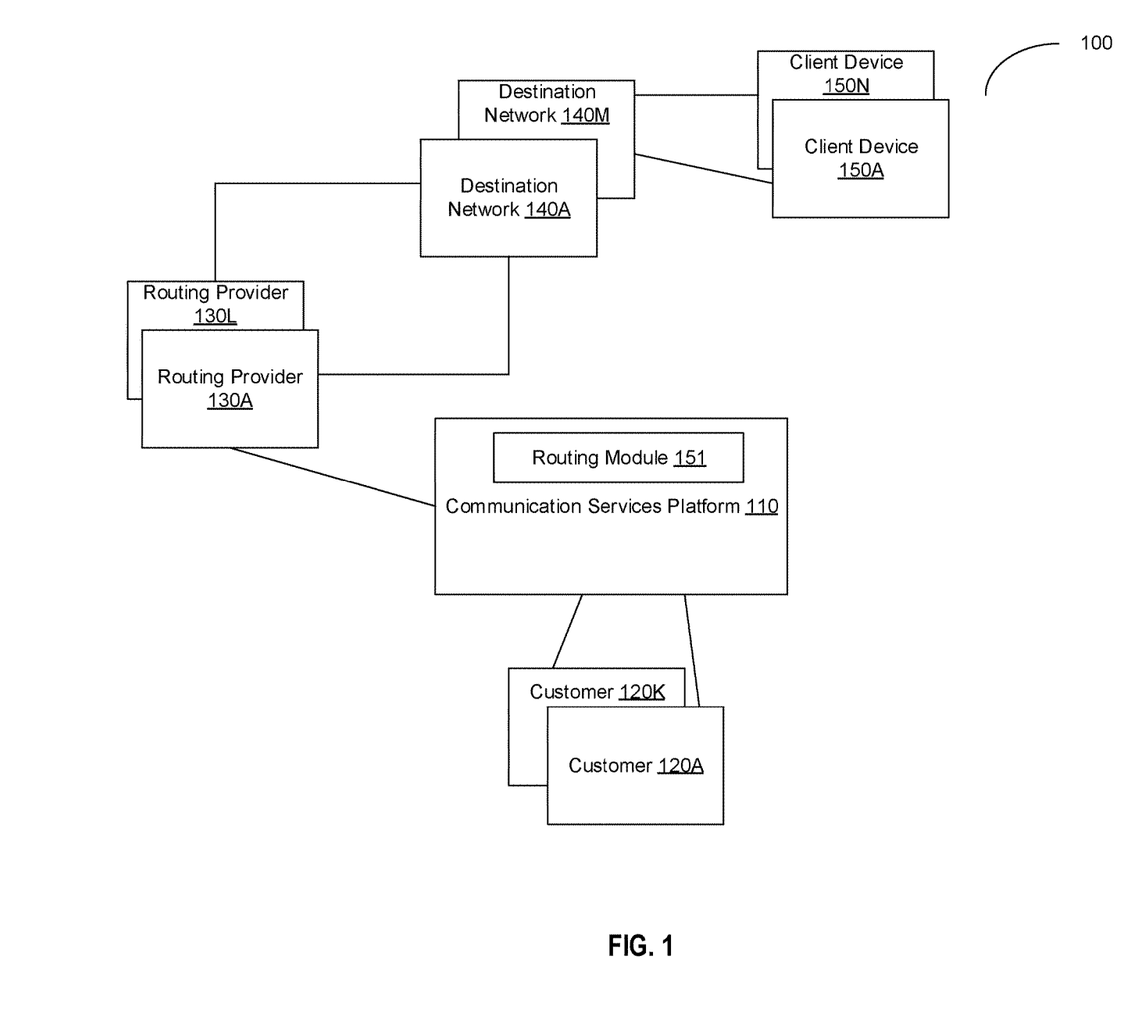
FIG. 1 illustrates an example system architecture of a communication services platform, in accordance with aspects of the disclosure.

FIG. 1 illustrates an example distributed system architecture ("system") 100 implemented in accordance with aspects of the present disclosure. The distributed system architecture 100 supports a communication services platform 110, which may be implemented by one or more general purpose or specialized computing devices (such as servers), data stores (e.g., hard disks, memories, databases), networks, other hardware components that are utilized to run one or more software services, such as message routing services, and various middleware and operating systems. The computing devices may be disposed in one or more physical locations, which may include geographically distributed physical locations.

In some implementations, communication services platform 110 may implement a Software as a Service (SaaS) platform that provides messaging services for forwarding messages (such as SMS messages, MMS messages, and/or IM messages) generated by multiple message-originating entities (e.g., customers 120A-120K of the communication services platform) to client devices 150A-150N via a pool of message routing providers 130A-130L serving respective destination networks 140A-140M. In some implementations, the communication services platform 110 may further provide various other services, including voice services, electronic mail services, video services, and/or chat messaging services.

The communication services platform 110 may be accessed (e.g., via one or more application programming interface (API) endpoints) by customer computing devices 120A-120K via a communication network, which can include one or more public networks (e.g., the Internet) and/or private networks (e.g., a local area network (LAN) or wide area network (WAN)) utilizing various physical and datalink layer technologies, such as wired networks (e.g., Ethernet network), wireless networks (e.g., an 802.11 network or a Wi-Fi network), and/or cellular networks (e.g., a Long Term Evolution (LTE) network).

A customer computing device 120A-120K may be represented by a general purpose or specialized computing device implementing a server running one or more applications that utilize one or more messaging technologies (such as Short Message Service (SMS) or Multimedia Messaging Service (MMS)) for communicating with client applications running on client devices 150A-150N.

A client device 150A-150N may be represented by a general purpose or specialized computing device, such as a mobile communication device (e.g., a smartphone), a portable computer (PC), a wearable device (e.g., smart watch, smart glasses, etc.), a network-connected television set, a smart appliance (e.g., a video doorbell), etc. In some implementations, a client device 150 may run one or more client applications that communicate (e.g., using one or more messaging technologies) with one or more customer computing device 120A-120K. In various example use cases, a client application running on a client device 150 may be a web application or a standalone application implementing a graphical user interface (GUI).

In some implementations, an API endpoint exposed by the communication services platform 110 may be accessed via a resource identifier, such a universal resource identifier (URI). The API endpoint may receive requests and return responses from/to customers 120A-120K. In various implementations, the API endpoint may implement, e.g., a REST (Representational State Transfer) API, a GraphQL API, a SOAP (Simple Object Access Protocol) API accessible via HTTP (Hypertext Transfer Protocol)/HTTPS (Hypertext Transfer Protocol Secure) or other suitable application layer protocols.

In some implementations, the API endpoint may be used for initiating a messaging request that may include one or more destination identifiers (e.g., recipient phone numbers), the message content (e.g., text and/or multimedia content), and the origin identifier (e.g., a sender phone number). In some implementations, outgoing messages may be automatically assigned an origin identified that is associated with the customer account.

Message routing providers 130A-130L that are utilized by a given communication services platform may employ different communication technologies, networks, and/or configurations. In an illustrative example, each messaging provider 130 may route the incoming messages to specified destinations via one or more messaging gateways (e.g., SMS gateways). Accordingly, message routing providers 130A-130L may exhibit different values of one or more chosen quality and/or performance metrics. In an illustrative example, a performance metric may be derived from a message conversion rate, which reflects an estimated likelihood of successful message delivery to the intended recipients. Furthermore, each message routing provider 130A-130L may have its own pricing model, which may be, e.g., a fixed price for routing a specified number of messages, volume-dependent price, time-of-day dependent price, and/or various combinations of these and other pricing models.

Conversely, each customer 120A-120K of the communication services platform 110 may choose its own traffic optimization objective, which may be expressed by a set of requirements, e.g., specifying the desired message conversion rate and price. In an illustrative example, the set of requirements may prescribe maximizing the message conversion rate while not exceeding a specified maximum price. In another illustrative example, the set of requirements may prescribe minimizing the price while not falling below a specified minimum message conversion rate.

In order to meet the customer requirements, the communication services platform 110 may dynamically allocate customer-originating messages to the available message routing providers for a specified destination network (e.g., identified by the Mobile Country Code (MCC) and/or Mobile Network Code (MNC)). The destination network identifier(s) may be derived from the destination phone number or other destination endpoint identifier.

In an illustrative example, the communication services platform 110 may identify, in an MCC/MNC directory, a record mapping at least a part of the destination phone number to the corresponding destination network (identified by the MCC and/or MNC). Then, the communication services platform 110 may select, from the pool of available message routing providers, a subset of message routing providers 130A-130L that serve the identified destination network.

In an illustrative example, the communication services platform 110 may utilize the messaging providers' message conversion rates and pricing models for selecting a messaging provider. The routing decisions may be made by the message routing module 151 of the communication services platform 110 by feeding the computed message conversion rates to one or more customer-specific routing models. A routing model may treat the message conversion rates as estimated likelihood of message delivery by respective message routing provider. Accordingly, the routing module may distribute the customer-originated messages among the routing providers in order to satisfy the customer-specific traffic optimization objective. Thus, the message delivery feedback reported by multiple feedback-providing customers is pooled together and utilized for estimating provider-specific message conversion rates, which then are used for routing decisions for message delivery feedback-providing customers and/or no-feedback customers, as described in more detail herein below.

In situations in which the systems discussed here collect personal information about users, or may make use of personal information, the users may be provided with an opportunity to control whether the communication services platform 110 collects user information, or to control whether and/or how to receive content from the communication services platform 110 that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the communication services platform 110.

Elements of FIG. 1 are used with respect to FIGS. 2-6 to help describe various aspects and features of the communication services platform 110.

Figure 2:
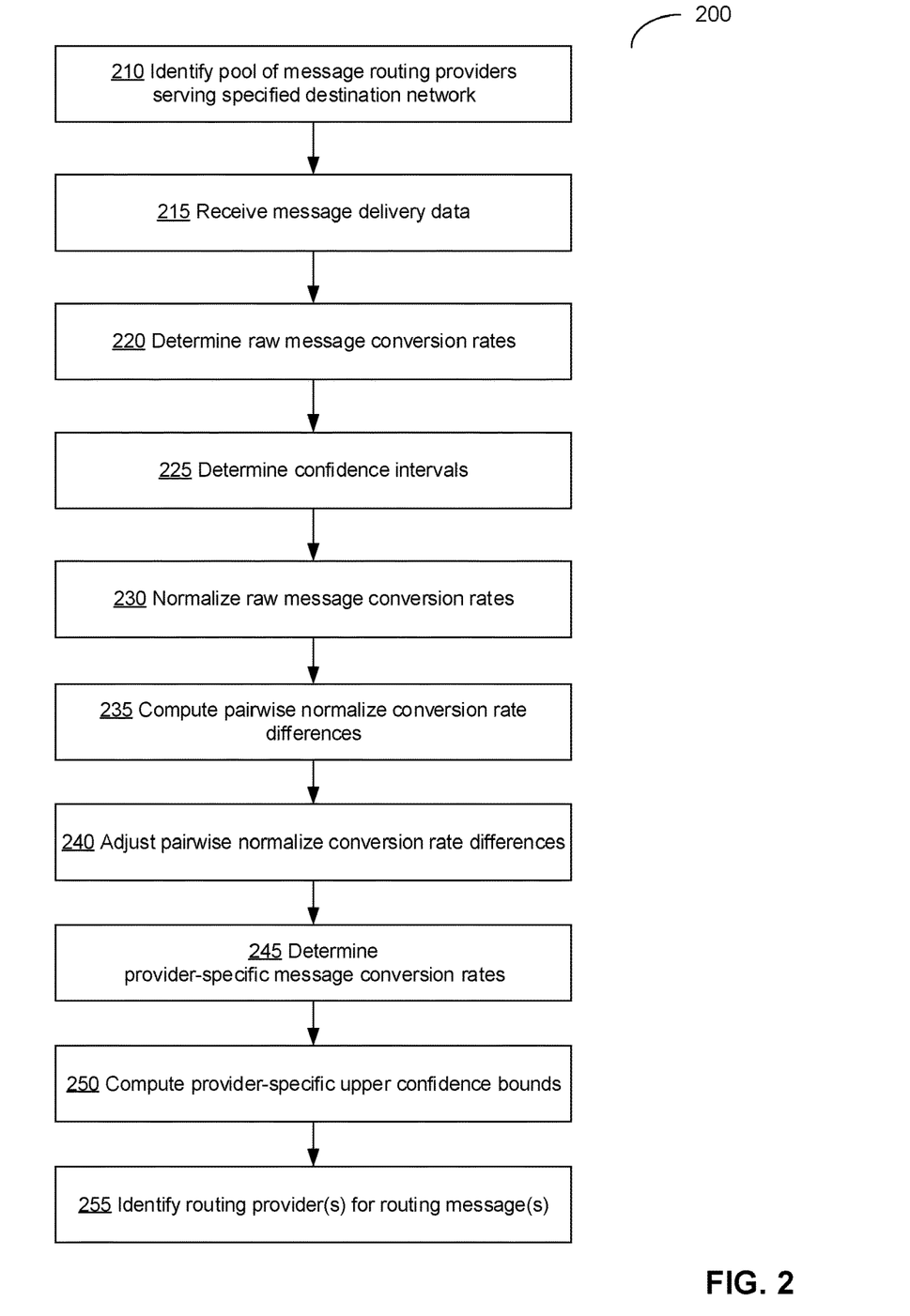
FIG. 2 is a flow diagram of an example method of estimating message conversion rates based on message delivery data reported by multiple customers, in accordance with aspects of the present disclosure.

FIG. 2 is a flow diagram of an example method 200 of estimating message conversion rates based on message delivery data reported by multiple customers, in accordance with aspects of the present disclosure. The method 200 can be performed for each destination network that is served by the communication services platform. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 is performed by the one or more modules (e.g., message routing module 151) of the communication services platform 110 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 210, the processing logic implementing the method identifies a pool of message routing providers serving a specified destination network, as described in more detail herein above.

At operation 215, the processing logic receives, from multiple message-originating entities (e.g., customers of the communication services platform) message delivery data reflecting message delivery by the pool of message routing providers to the specified destination network. The message delivery data provided to the communication services platform by each customer includes, for each message routing provider that has been employed to route the customer's messages, the number of messages routed and the number of messages successfully delivered. The message delivery data may be sent periodically by each customer to the communication services platform, such that the communication services platform may maintain the cumulative total numbers of messages routed and successfully delivered by each provider for each customer. In an illustrative example, the communication services platform may employ the example data structure 300 of FIG. 3 for storing the cumulative total numbers of messages routed and successfully delivered by each provider for each customer.

Figure 3:
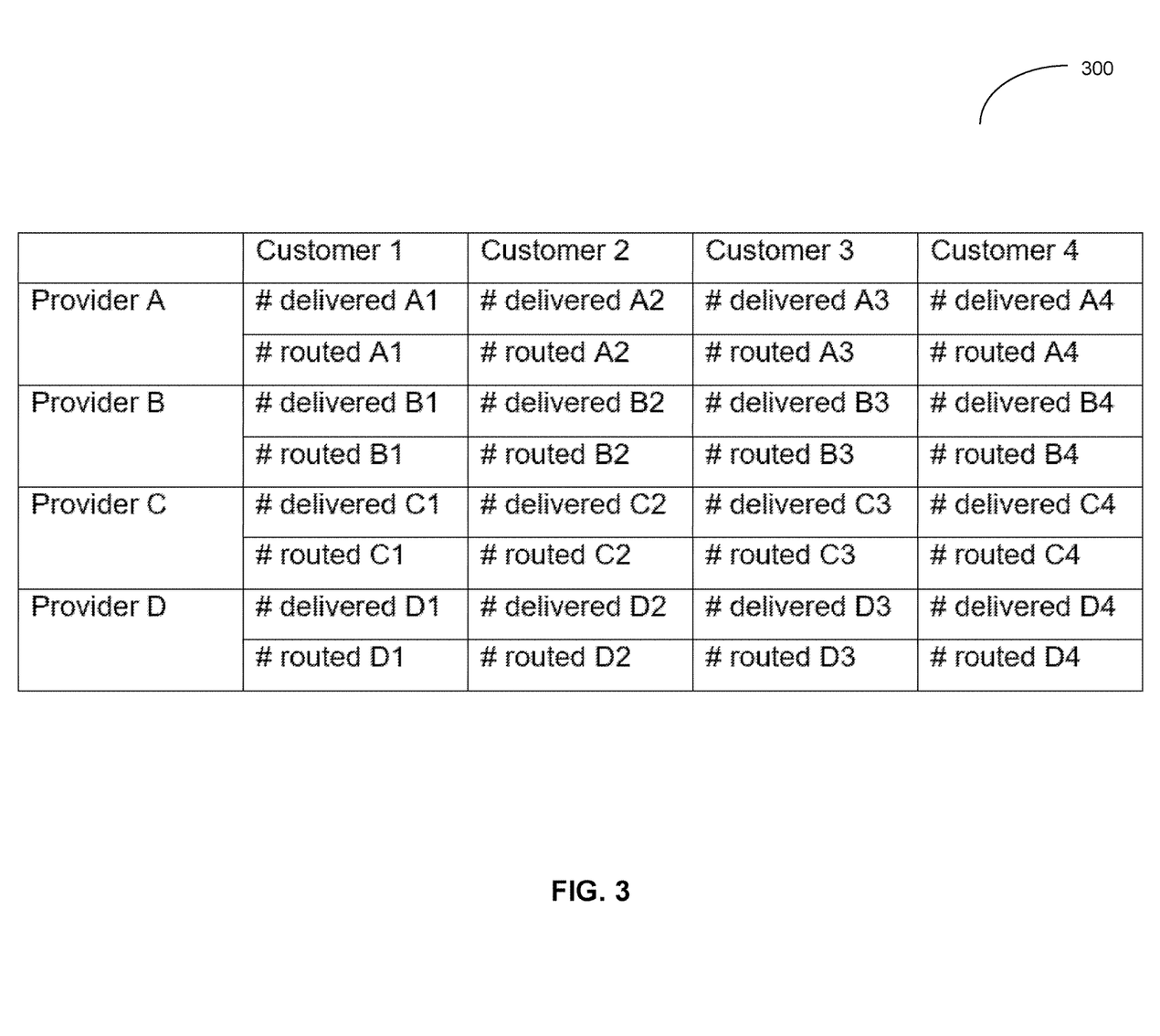
FIG. 3 schematically illustrates a memory data structure which can be employed for storing message delivery data by communication services platform operating in accordance with aspects of the present disclosure.

As schematically illustrated by FIG. 3, the example data structure 300 is maintained by the communication services platform for storing the customer-reported message delivery data reflecting message routing and delivery to a specified destination network serviced by a pool of message routing providers. The example data structure 300 is a rectangular two-dimensional table, each vector of the first dimension of which (e.g., each row) of which corresponds to a message routing provider of the pool of message routing providers servicing the destination network. Conversely, each vector of the second dimension (e.g., each column) of the example data structure 300 corresponds to a feedback-providing customer that periodically reports the message delivery data to the communication services network. Thus, each cell of the table identified by an intersection of a row and a column contains two numbers: the number of messages that have been routed by the provider identified by the index of the row for the customer identified by the index of the column and the number of messages that have been successfully delivered to the respective recipients. As noted herein above, the communication services platform may periodically receive the message delivery data from the feedback-providing customers and maintain the cumulative total numbers of messages routed and successfully delivered by each provider for each customer.

While in the illustrative example of FIG. 3 the example data structure 300 is shown as a two-dimensional table, in various other implementations, other types of data structures, such as linear arrays or multi-dimensional arrays, can be employed.

Referring again to FIG. 2, at operation 220, the processing logic determines, based on the message delivery data, a set of raw message conversion rates for respective message routing providers and customers. Each raw message conversion rate of the set of raw message conversion rates is computed as the ratio of the number of delivered messages to the number of forwarded messages by a given message routing provider for a given customer:

$$CR_{ij} = D_{ij}/R_{ij},$$

where $CR_{ij}$ is the message conversion rate for message routing provider i routing messages originated by customer j, $D_{ij}$ is the number of messages successfully delivered by message routing provider i for customer j, and $R_{ij}$ is the number of messages routed by message routing provider i for customer j.

At operation 225, the processing logic determines, for each raw message conversion rate of the set of computed raw message conversion rates, a corresponding confidence interval. The confidence interval reflects the number of forwarded messages by a given message routing provider to a given customer. In some implementations, the confidence interval can be computed based on the Student's distribution with specified desired distribution parameters (e.g., 95% confidence interval).

At operation 230, the processing logic normalizes each customer's set of raw message conversion rates (e.g., corresponding to the message delivery data stored in a given column of the example data structure 300) by the maximum raw message conversion rate among the set of raw message conversion rates:

$$CRN_{ij}=CR_{ij}/\max_i(CR_{ij}),$$

where $CRN_{ij}$ is the normalized message conversion rate for message routing provider i routing messages originated by customer j, and $\max_i (CR_{ij})$ is the maximum message conversion rate among all message conversion rates for customer j.

At operation 235, the processing logic computes the pairwise normalized message conversion rate differences for each pair of message routing providers based on the message delivery data of a given customer. Accordingly, for customer j, a set of pairwise differences is computed $CRN_{kj}-CRN_{ij}$ for all providers k and l, where k≠l.

At operation 240, the processing logic calculates the average weighted pairwise differences of normalized conversion rate across all customers for each routing message provider pair. The weight coefficients may be chosen as the inverse squared sum of the confidence interval values of the corresponding message routing provider pair:

$$w_{klj}=1/(CI_{kj}+CI_{lj})^2,$$

where $w_{klj}$ is the weight coefficient to be applied to the pairwise message conversion rate difference of message routing providers k and l based on the message delivery data of the customer j. Accordingly, the adjusted pairwise normalized message conversion rate differences calculated across all customers can be expressed as follows:

$$CR_k-CR_l=(\Sigma_k(CRN_{kj}-CRN_{lj})*w_{klj})/\Sigma_k w_{klj}$$

where $CR_k$ and $CR_l$ are message conversion rates for providers k and l respectively, based on the message delivery data reported by multiple customers. The pairwise differences form a system of linear equations for which each equation is linearly weighted by $w_{klj}$.

At operation 245, the processing logic solves the system of linear equations formed by the adjusted pairwise normalized message conversion rate differences computed at operation 280. The solution may be obtained by solving a convex linear optimization task with the objective to minimize the least squared error and while bounding the resulting conversing rate to be between 0 and 1.

The solution may be shifted such that the message routing provider with the highest normalized message conversion rate has the highest possible message conversion rate (i.e., 100%). This determines provider-specific message conversion rates.

At operation 250, the processing logic aggregates the messages routed by each message routing providers based on the message delivery data, thus computing provider-specific UCBs of message conversion rates:

$$UCB_i=CR_i+CI_i,$$

where $UCB_i$ is the upper confidence bound for message routing provider i based on the message delivery data reported by all customers, and $CI_i$ is the confidence interval for message routing provider i computed based on the number of messages routed.

At operation 255, the processing logic identifies one or more message routing providers for routing one or more messages to the destination network. In some implementations, the routing decisions may be made based on the message conversion rates for respective message routing providers computed at operation 250. Alternatively, the routing decisions may be made based on the upper confidence bounds of message conversion rates for respective message routing providers computed at operation 255.

As noted herein above, each of the customers may have its own traffic optimization objective expressed by a corresponding set of requirements, e.g., specifying the desired message conversion rate and price. In an illustrative example, the set of requirements may prescribe maximizing the message conversion rate while not exceeding a specified maximum price. In another illustrative example, the set of requirements may prescribe minimizing the price while not falling below a specified minimum message conversion rate.

In order to meet the customer requirements, the communication services platform 110 may dynamically allocate customer-originating messages to the available message routing providers for the specified destination network. In some implementations, the communication services platform may feed the computed message conversion rates to one or more customer-specific routing models. A routing model may treat the message conversion rates as estimated likelihood of message delivery by respective message routing provider. Accordingly, the routing module may distribute the customer-originated messages among the routing providers in order to satisfy the customer-specific traffic optimization objective. In some implementations, the customer requirements and the computed message conversion rates may be utilized to formulate a linear optimization task, the solution of which can represent the message allocation strategy (i.e., the number of messages to be allocated to each message routing provider of a chosen subset of message routing providers serving the given destination network) that would satisfy the customer requirements.

Figure 4:
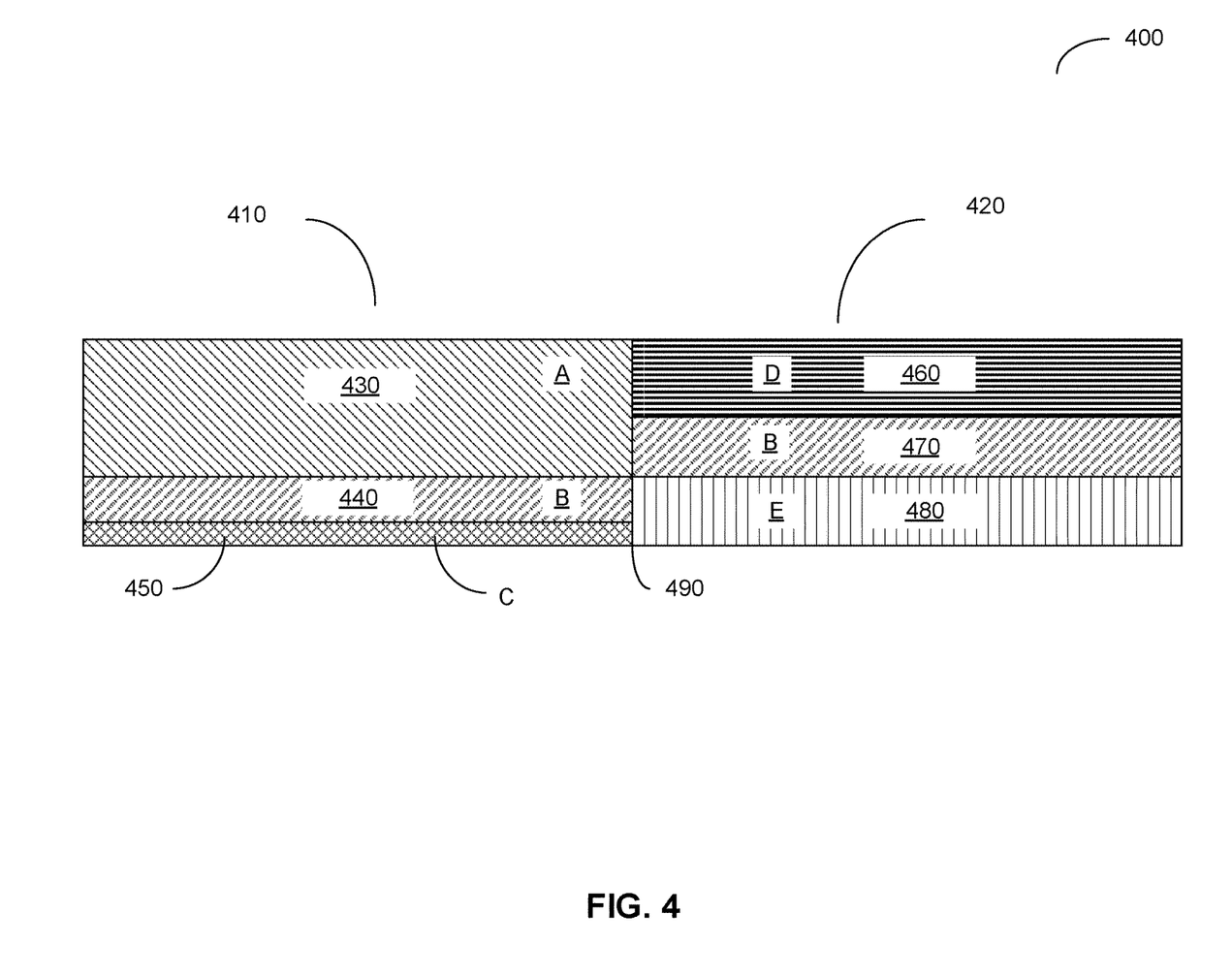
FIG. 4 graphically illustrates an example message routing strategy implemented by the communication services platform operating in accordance with aspects of the present disclosure.

FIG. 4 graphically illustrates an example message routing strategy implemented by the communication services platform operating in accordance with aspects of the present disclosure. In the illustrative example of FIG. 4, the set of customer requirements prescribes maximizing the message conversion rate while not exceeding a specified maximum cost.

Accordingly, during the time period 410, the communication services platform allocates, based on the computed message conversion rates, the first portion 430 of messages to message routing provider A, which has the best message conversion rate and the highest per-message price; the second portion of messages 440 is allocated to message routing provider B, which has the second best message conversion rate and a lower per-message price, such that the total cost of message delivery for the customer would not exceed the specified maximum cost. In some implementations, a third portion of messages 450 is allocated to a provider C for exploration, i.e., for determining the provider's message conversion rate, even if such allocation may produce a slightly suboptimal overall allocation. In order to limit the adverse effect of the exploratory allocation on the resulting routing strategy, the number of messages allocated to a provider for exploration may be limited by a predefined threshold number of share (e.g., 5%) of all messages for a given customer.

As the new message delivery data comes in, the message routing platform, at the time moment 490, detects a significant change in the message conversion rate of the message routing provider A. "Significant" change herein is defined as a change of the message conversion rate that exceeds a predefined threshold portion of the message conversion rate (e.g., 10%) and thus requires swift updating of the current message routing strategy. An example method of detecting a significant change in a message conversion rate is described herein below with reference to FIG. 5.

Referring again to FIG. 4, during the time period 420, the communication services platform allocates, based on the updated message conversion rates, the first portion 460 of messages to message routing provider D, which now has the best message conversion rate and the highest per-message price; the second portion of messages 470 is allocated to message routing provider B, which has the second best message conversion rate and a lower per-message price; the third portion of messages 480 is allocated to message routing provider E, which has a lower message conversion rate and a lower per-message price, such that the total cost of message delivery for the customer would not exceed the specified maximum cost.

Thus, the message delivery feedback reported by multiple feedback-providing customers is pooled together and utilized for estimating provider-specific message conversion rates, which then are used for routing decisions (e.g., by method 200) for message delivery feedback-providing customers and/or no-feedback customers.

Figure 5:
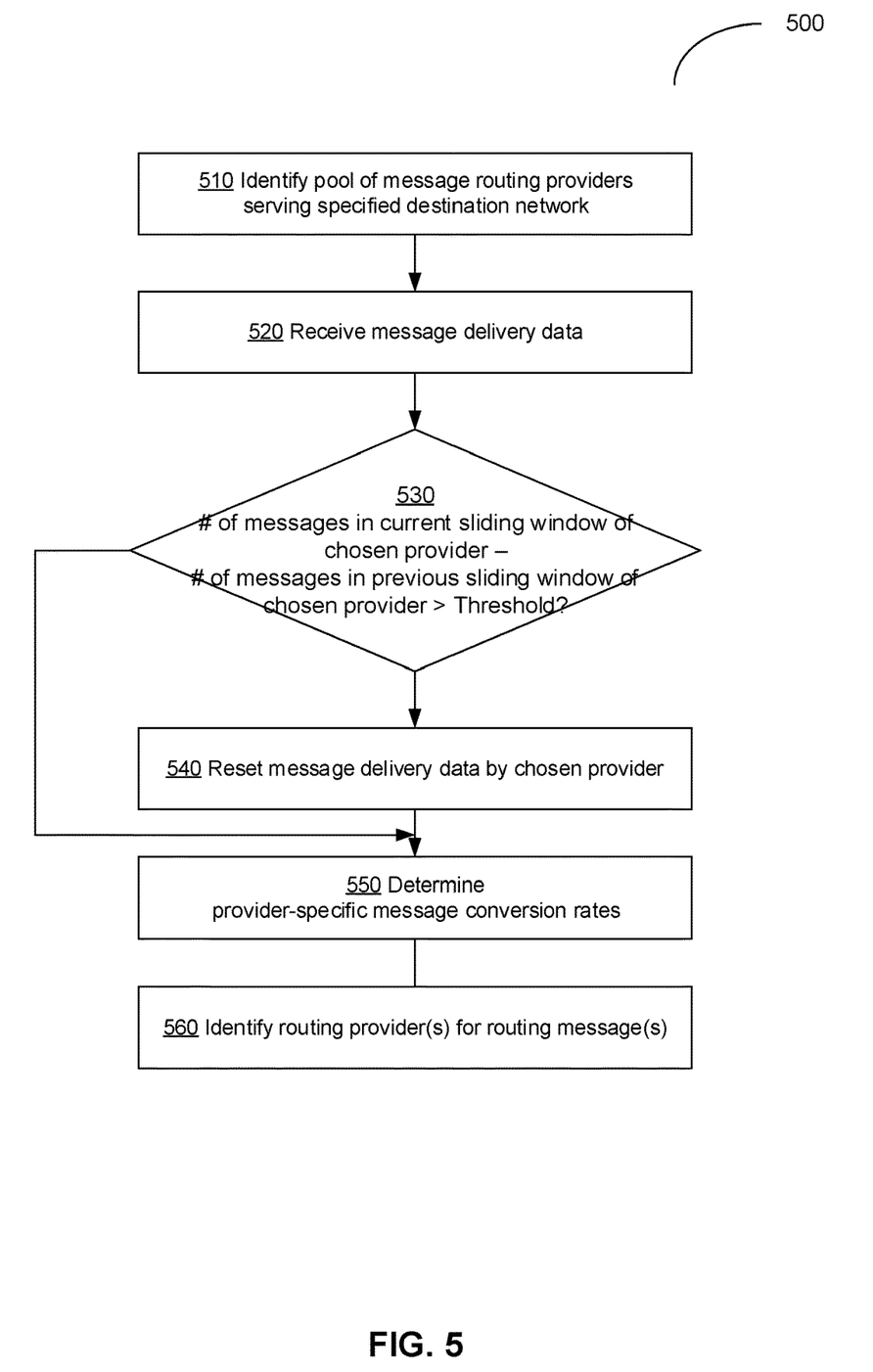
FIG. 5 is a flow diagram of an example method 500 of detecting statistically significant changes in provider-specific message conversion rates based on message delivery data reported by multiple customers, in accordance with aspects of the present disclosure.

FIG. 5 is a flow diagram of an example method 500 of detecting statistically significant changes in provider-specific message conversion rates based on message delivery data reported by multiple customers, in accordance with aspects of the present disclosure. The method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 500 is performed by the one or more modules (e.g., message routing module 151) of the communication services platform 110 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 510, the processing logic implementing the method identifies a pool of message routing providers associated with a specified destination network, as described in more detail herein above.

At operation 520, the processing logic receives, from multiple message-originating entities (e.g., customers of the communication services platform) message delivery data reflecting message delivery by the pool of message routing providers to the specified destination network. The message delivery data provided to the communication services platform by each customer includes, for each message routing provider that has been employed to route the customer's messages, the number of messages routed and the number of messages successfully delivered. The message delivery data may be sent periodically by each customer to the communication services platform, such that the communication services platform may maintain the cumulative total numbers of messages routed and successfully delivered by each provider for each customer. In an illustrative example, the communication services platform may employ the example data structure 300 of FIG. 3 for storing the cumulative total numbers of messages routed and successfully delivered by each provider for each customer.

At operation 530 the processing logic compares the number of messages successfully routed by a certain message routing provider in the previous short-term sliding window and the number of messages successfully routed by the certain message routing provider in the current short-term sliding window. Each sliding window is defined by a timeframe during which a chosen message routing provider has routed a predefined number (e.g., 1000) of messages. Accordingly, the short-term sliding window would include the predefined number of messages routed by the chosen message routing provider and would further include all the messages that have been routed by other message routing providers of the pool of message routing providers within a chosen long-term sliding window (i.e., a timeframe based on which the message conversion rates of message routing providers are estimated; it is typically many folds larger than the short-term sliding window). Accordingly, for each message routing provider, the communication services platform maintains a corresponding current and previous sliding windows in order to detect significant changes in the message conversion rate for that provider.

Responsive to determining, at operation 530, that the difference between the number of messages successfully routed by a chosen message routing provider in the previous sliding window and the number of messages successfully routed by the certain message routing provider in the current sliding window exceeds a predefined threshold, the processing logic, at operation 540, resets message delivery counters associated with the certain message routing provider in the long-term sliding window.

At operation 550, the processing logic estimates, based on the updated message delivery data, for each message routing provider of the plurality of message routing providers, a corresponding updated message conversion rate, as described in more detail herein above with references to FIG. 2. The long-term sliding window is shifted such that it includes only historical routing outcomes after the reset.

At operation 560, the processing logic identifies one or more message routing providers for routing one or more messages to the destination network, based on the message conversion rates for respective message routing providers computed at operation 550, as described in more detail herein above with references to FIG. 4.

Figure 6:
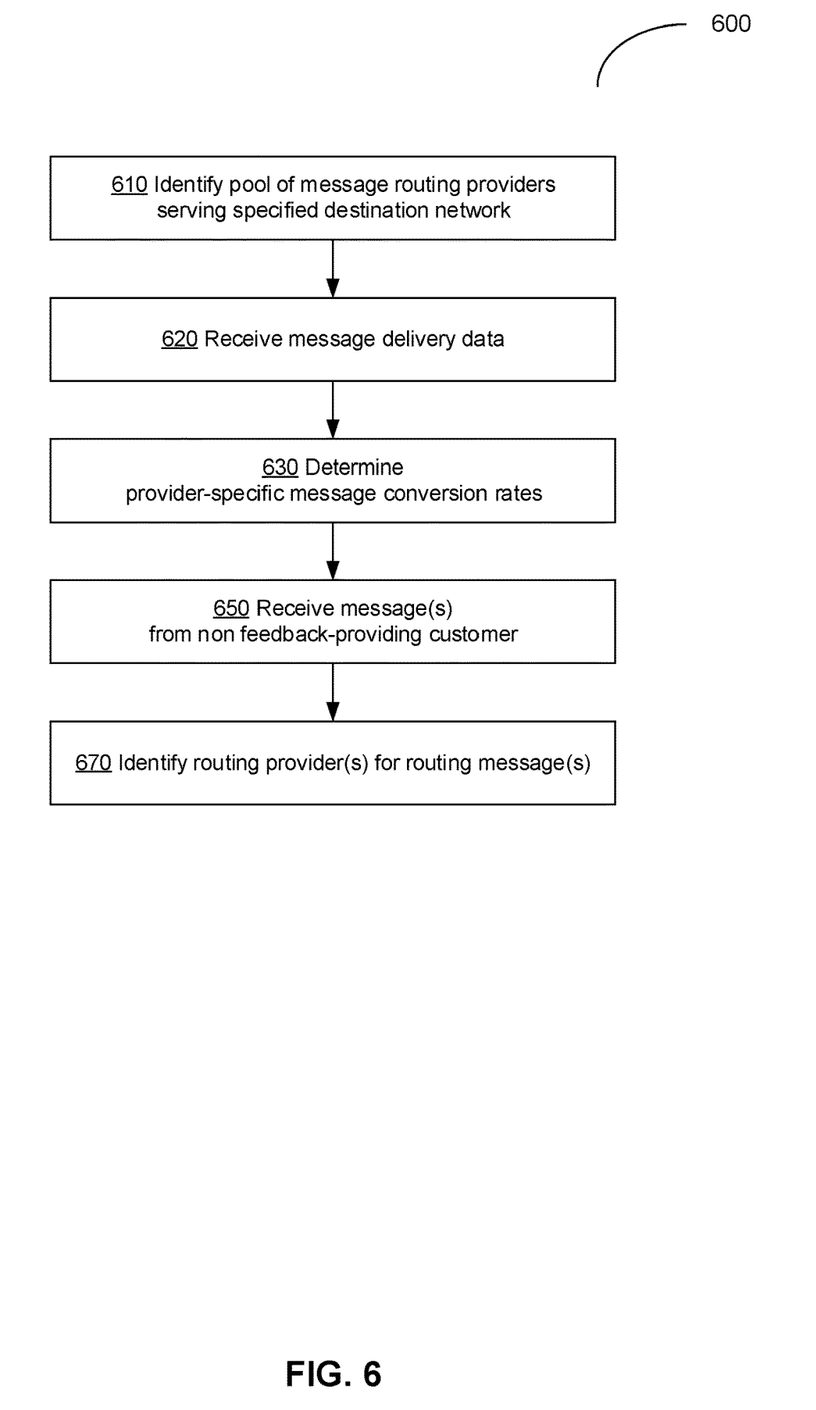
FIG. 6 is a flow diagram of an example method of selecting message routing providers for no-feedback customers based on message delivery data reported by multiple customers, in accordance with aspects of the present disclosure.

FIG. 6 is a flow diagram of an example method 600 of selecting message routing providers for no-feedback customers based on message delivery data reported by multiple customers, in accordance with aspects of the present disclosure. The method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 600 is performed by the one or more modules (e.g., message routing module 151) of the communication services platform 110 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 610, the processing logic implementing the method identifies a pool of message routing providers associated with a specified destination network, as described in more detail herein above.

At operation 620, the processing logic receives, from multiple message-originating entities (e.g., customers of the communication services platform) message delivery data reflecting message delivery by the pool of message routing providers to the specified destination network. The message delivery data provided to the communication services platform by each customer includes, for each message routing provider that has been employed to route the customer's messages, the number of messages routed and the number of messages successfully delivered. The message delivery data may be sent periodically by each customer to the communication services platform, such that the communication services platform may maintain the cumulative total numbers of messages routed and successfully delivered by each provider for each customer. In an illustrative example, the communication services platform may employ the example data structure 300 of FIG. 3 for storing the cumulative total numbers of messages routed and successfully delivered by each provider for each customer.

At operation 630, the processing logic estimates, based on the message delivery data, for each message routing provider of the plurality of message routing providers, a corresponding message conversion rate reflecting a likelihood of successful message delivery by a respective message routing provider to the specified destination network, as described in more detail herein above with references to FIG. 2.

At operation 640, the processing logic receives, from a message-originating entity that has not provided at least part of the message delivery data, one or more messages to be forwarded to their respective destinations.

At operation 650, the processing logic identifies, based on message conversion rates for respective message routing providers, one or more message routing providers for routing the one or more messages to the destination network, as described in more detail herein above with references to FIG. 4.

Figure 7:
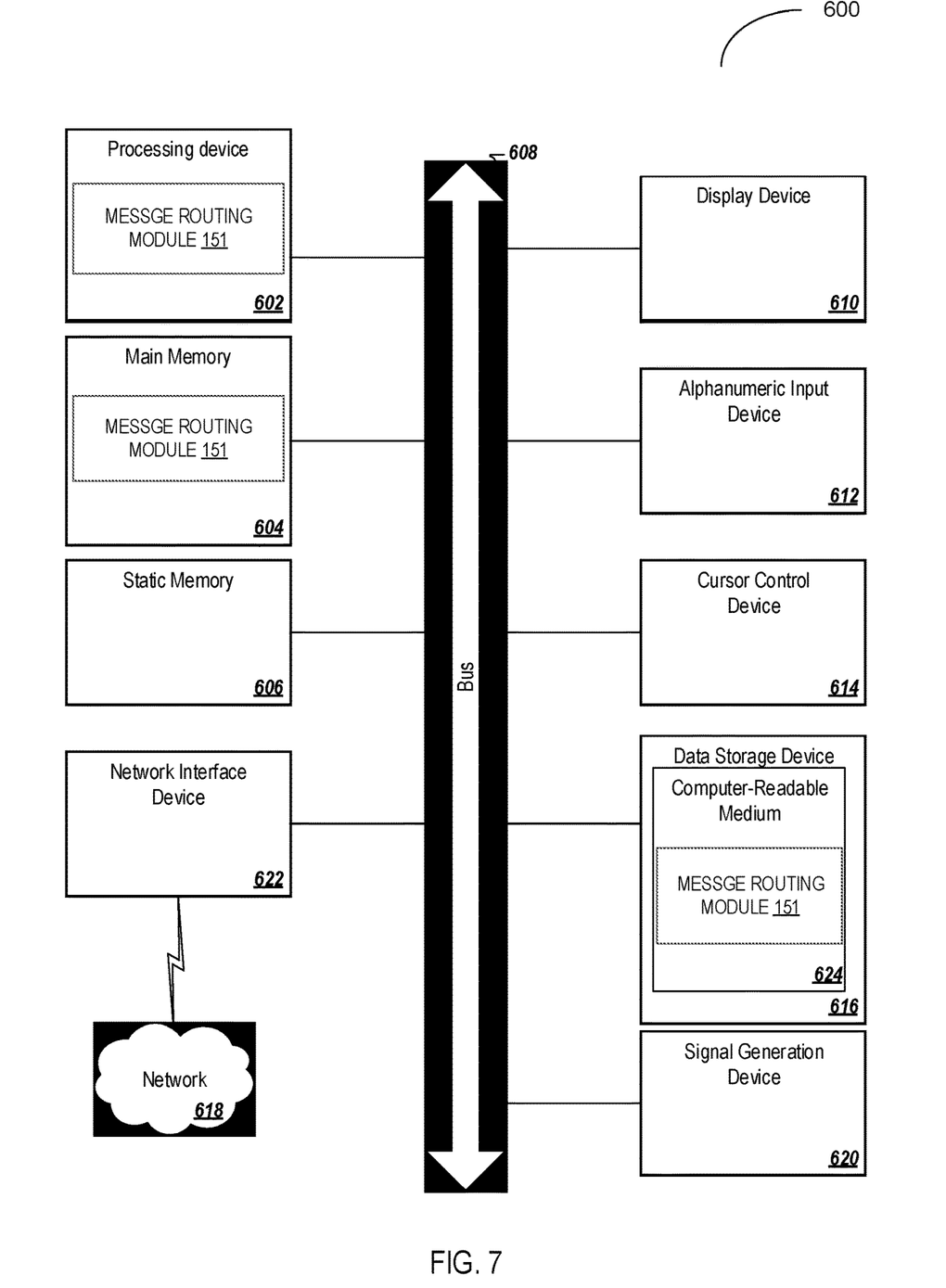
FIG. 7 is a block diagram illustrating an exemplary computer system, in accordance with some implementations of the disclosure.

FIG. 7 is a block diagram illustrating an exemplary computer system 700, in accordance with an implementation of the disclosure. The computer system 700 executes one or more sets of instructions that cause the machine to perform any one or more of the methodologies discussed herein. Set of instructions, instructions, and the like may refer to instructions that, when executed by computer system 700, cause computer system 700 to perform one or more operations of message routing module 151. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 707 (e.g., flash memory, static random access memory (SRAM), etc.), and a data storage device 717, which communicate with each other via a bus 708.

The processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions of the distributed system architecture 100 and the message routing module 151 for performing the operations discussed herein.

The computer system 700 may further include a network interface device 722 that provides communication with other machines over a network 718, such as a local area network (LAN), an intranet, an extranet, or the Internet. The computer system 700 also may include a display device 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 717 may include a non-transitory computer-readable storage medium 724 on which is stored the sets of instructions of the distributed system architecture 100 of the message routing module 151 implementing the methods described herein. The sets of instructions of the distributed system architecture 100 and of the message routing module 151 may also reside, completely or at least partially, within the main memory 704 and/or within the processing device 702 during execution thereof by the computer system 700, the main memory 704 and the processing device 702 also constituting computer-readable storage media. The sets of instructions may further be transmitted or received over the network 718 via the network interface device 722.

While the example of the computer-readable storage medium 624 is shown as a single medium, the term "computer-readable storage medium" may include a single medium or multiple media (e.g., a centralized or distributed database, and/or associated caches and servers) that store the sets of instructions. The term "computer-readable storage medium" may include any medium that is capable of storing, encoding or carrying a set of instructions for execution by the machine and that causes the machine to perform any one or more of the methodologies of the disclosure. The term "computer-readable storage medium" may include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
    identifying, by a processing device, a plurality of message routing providers serving a specified destination network;
    receiving message delivery data reflecting message delivery by the plurality of message routing providers to the specified destination network;
    determining, based on the message delivery data, a set of raw conversion rates for respective message routing providers, wherein each raw conversion rate of the set of raw conversion rates reflects a ratio of a number of delivered messages to a number of forwarded messages by a respective message routing provider;
    determining, for each raw conversion rate of the set of raw conversion rates, a respective confidence interval reflecting the number of forwarded messages by the respective message routing provider;
    producing a plurality of pairwise normalized conversion rate differences by computing, for each pair of message routing providers, a corresponding pairwise normalized conversion rate differences;
    computing message conversion rates based on the plurality of pairwise normalized conversion rate differences;
    identifying, based on message conversion rates for the respective message routing providers, one or more message routing providers for routing one or more messages to the specified destination network; and
    routing, via the one or more message routing providers, the one or more messages to the specified destination network.

2. The method of claim 1, wherein determining the set of raw conversion rates for the respective message routing providers further comprises:
    normalizing the set of raw conversion rates by a maximum raw conversion rate among the set of raw conversion rates.

3. The method of claim 1, wherein computing the plurality of pairwise normalized conversion rate differences for respective pairs of message routing providers further comprises:

adjusting the plurality of pairwise normalized conversion rate differences by multiplying each pairwise normalized conversion rate difference by a weight coefficient.

4. The method of claim 1, further comprising:

determining that a difference between a first number of messages successfully routed by a certain message routing provider in a previous sliding window and a second number of messages successfully routed by the certain message routing provider in a current sliding window exceeds a defined threshold, producing updated message delivery data by resetting message delivery counters associated with the certain message routing provider;

estimating, based on the updated message delivery data, for each message routing provider of the plurality of message routing providers, a corresponding message conversion rate.

5. The method of claim 4, wherein the current sliding window comprises a predefined number of messages routed by a first message routing provider of the plurality of message routing providers, wherein the predefined number of messages have been routed by the first message routing provider within a certain timeframe, and wherein the current sliding window further comprises all messages that have been routed within the certain timeframe by other message routing providers of the plurality of message routing providers.

6. The method of claim 1, wherein identifying one or more message routing providers for routing one or more messages to the specified destination network further comprises:

determining that the one or more message routing providers satisfy a provider selection criterion specifying a maximum message delivery cost.

7. The method of claim 1, wherein identifying one or more message routing providers for routing the one or more messages to the specified destination network further comprises:

identifying a first message routing provider satisfying a provider selection criterion specifying a maximum message delivery cost; and identifying a second message routing provider of the plurality of message routing providers.

8. A system, comprising:

a memory; and a processing device coupled with the memory, the processing device configured to:

identify a plurality of message routing providers serving a specified destination network;

receive message delivery data reflecting message delivery by the plurality of message routing providers to the specified destination network;

determine, based on the message delivery data, a set of raw conversion rates for respective message routing providers, wherein each raw conversion rate of the set of raw conversion rates reflects a ratio of a number of delivered messages to a number of forwarded messages by a respective message routing provider;

determine, for each raw conversion rate of the set of raw conversion rates, a respective confidence interval reflecting the number of forwarded messages by the respective message routing provider;

produce a plurality of pairwise normalized conversion rate differences by computing, for each pair of message routing providers, a corresponding pairwise normalized conversion rate difference;

compute message conversion rates based on the plurality of pairwise normalized conversion rate differences;

identify, based on message conversion rates for the respective message routing providers, one or more message routing providers for routing one or more messages to the specified destination network; and route, via the one or more message routing providers, the one or more messages to the specified destination network.

9. The system of claim 8, wherein determining the set of raw conversion rates for the respective message routing providers further comprises:

normalizing the set of raw conversion rates by a maximum raw conversion rate among the set of raw conversion rates.

10. The system of claim 8, wherein computing the plurality of pairwise normalized conversion rate differences for respective pairs of message routing providers further comprises:

adjusting the plurality of pairwise normalized conversion rate differences by multiplying each pairwise normalized conversion rate difference by a weight coefficient.

11. The system of claim 8, wherein the processing device is further configured to:

determine that a difference between a first number of messages successfully routed by a certain message routing provider in a previous sliding window and a second number of messages successfully routed by the certain message routing provider in a current sliding window exceeds a defined threshold, producing updated message delivery data by resetting message delivery counters associated with the certain message routing provider;

estimate, based on the updated message delivery data, for each message routing provider of the plurality of message routing providers, a corresponding message conversion rate.

12. The system of claim 11, wherein the current sliding window comprises a predefined number of messages routed by a first message routing provider of the plurality of message routing providers, wherein the predefined number of messages have been routed by the first message routing provider within a certain timeframe, and wherein the current sliding window further comprises all messages that have been routed within the certain timeframe by other message routing providers of the plurality of message routing providers.

13. The system of claim 8, wherein identifying one or more message routing providers for routing one or more messages to the specified destination network further comprises:

determining that the one or more message routing providers satisfy a provider selection criterion specifying a maximum message delivery cost.

14. The system of claim 8, wherein identifying one or more message routing providers for routing the one or more messages to the specified destination network further comprises:

identifying a first message routing provider satisfying a provider selection criterion specifying a maximum message delivery cost; and identifying a second message routing provider of the plurality of message routing providers.

15. A non-transitory computer-readable storage medium comprising executable instructions that, responsive to execution by a processing device, cause the processing device to:
- identify a plurality of message routing providers serving a specified destination network;
- receive message delivery data reflecting message delivery by the plurality of message routing providers to the specified destination network;
- determine, based on the message delivery data, a set of raw conversion rates for respective message routing providers, wherein each raw conversion rate of the set of raw conversion rates reflects a ratio of a number of delivered messages to a number of forwarded messages by a respective message routing provider;
- determine, for each raw conversion rate of the set of raw conversion rates, a respective confidence interval reflecting the number of forwarded messages by the respective message routing provider;
- produce a plurality of pairwise normalized conversion rate differences by computing, for each pair of message routing providers, a corresponding pairwise normalized conversion rate difference;
- compute message conversion rates based on the plurality of pairwise normalized conversion rate differences;
- identify, based on message conversion rates for the respective message routing providers, one or more message routing providers for routing one or more messages to the specified destination network; and
- route, via the one or more message routing providers, the one or more messages to the specified destination network.

16. The non-transitory computer-readable storage medium of claim 15, wherein determining the set of raw conversion rates for the respective message routing providers further comprises:
- normalizing the set of raw conversion rates by a maximum raw conversion rate among the set of raw conversion rates.

17. The non-transitory computer-readable storage medium of claim 15, wherein computing the plurality of pairwise normalized conversion rate differences for respective pairs of message routing providers further comprises:
- adjusting the plurality of pairwise normalized conversion rate differences by multiplying each pairwise normalized conversion rate difference by a weight coefficient.

18. The non-transitory computer-readable storage medium of claim 15, wherein identifying one or more message routing providers for routing one or more messages to the specified destination network further comprises:
- determining that the one or more message routing providers satisfy a provider selection criterion specifying a maximum message delivery cost.

19. The non-transitory computer-readable storage medium of claim 15, wherein identifying one or more message routing providers for routing the one or more messages to the specified destination network further comprises:
- identifying a first message routing provider satisfying a provider selection criterion specifying a maximum message delivery cost; and
- identifying a second message routing provider of the plurality of message routing providers.

* * * * *